2,969,350

AZO DYESTUFFS AND THEIR METAL COMPLEX COMPOUNDS

Alfons Dorlars, Leverkusen, and Rolf Putter, Dusseldorf, Germany, assignors to Farbenfabriken Bayer Aktiengesellschaft, Leverkusen, Germany, a corporation of Germany No Drawing. Filed Oct. 21, 1958, Ser. No. 768,574

Claims priority, application Germany Aug. 2, 1958

7 Claims.  (Cl. 260—148)

The present invention relates to new azo dyestuffs and their metal complex compounds; more particularly it relates to azo dyestuffs of the formula

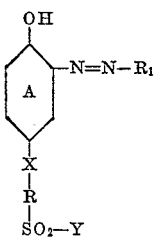

wherein X means a carbon-to-carbon bond, an oxygen or sulfur atom or an azo bridge, R means an arylene residue of the benzene or naphthalene series, $R_1$ stands for a diazo compound of a 1-amino-2-hydroxy- or -2-alkoxy-5-nitrobenzene and Y represents a hydroxyl, amino or substituted amino group. The dyestuffs of the above formula may carry in the benzene residue A alkyl, alkoxy, aryl, halogen or acylamino groups and in the radicals R and $R_1$ further substituents.

The invention further relates to the metal complex compounds, preferably the chromium, cobalt and copper complexes of the said dyestuffs.

It is an object of the invention to provide new o,o'-dihydroxy and o-hydroxy-o'-alkoxy azo dyestuffs. A further object is the provision of the metal complexes, preferably the chromium, cobalt and copper complexes of these new azo dyestuffs. Another object is to provide the process for saponifying the new o-hydroxy-o'-alkoxy azo dyestuffs under de-alkylating conditions.

The new azo dyestuffs and their metal complex compounds are obtained if diazotized 1-amino-2-hydroxy- or -2-alkoxy-5-nitrobenzenes which can be further substituted in the benzene nucleus, are combined with azo components of the general formula

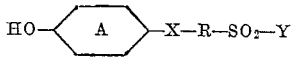

wherein R and Y have the meaning as indicated above and wherein the benzene residue may be substituted by alkyl-, alkoxy-, aryl-, halogen- or acylamino groups, and the azo dyestuffs thus obtained are transformed in substance or on a substrate into their metal complexes, preferably into their chromium or cobalt complex compounds.

The coupling of the starting components is carried out in alkaline medium. Suitable coupling components for the aforementioned combination are, for example, 4-hydroxydiphenyl-4'-sulfonic acid, 4-hydroxydiphenyl-4'-sulfonamide, -4'-sulfomethyl- or -4'-β-hydroxyethylamide, 4-hydroxydiphenyl-3'-sulfonic acid, 4-hydroxy-4'-amino- and -4'-acetylaminodiphenyl-3'-sulfonic acid, 4-hydroxydiphenylether-4'-sulfonic acid, 4-hydroxydiphenylether-4'-sulfonamide, 4-hydroxy-4'-chloro-diphenylether-2'-sulfonic acid, 4-hydroxydiphenylsulfide-4'-sulfonic acid, 4-hydroxy-azobenzene-2'-, -3'- and -4'-sulfonic acid, 4-hydroxy-3-methyl-azobenzene-2'-, -3'- and -4'-sulfonic acid, 4-hydroxy-3-chloro-azo-(1,1')-benzene-2'-, -3'- and -4'-sulfonic acid, 4-hydroxy-3-phenyl-azo-(1,1')-benzene-2'-, -3'- and -4'-sulfonic acid, 4-hydroxy-azo-(1,1')-benzene-3'-sulfonamide, 4-hydroxy-azo-(1,1')-benzene-3',5'-bis-sulfonamide, 4-hydroxybenzene-azo-(1,1')-naphthalene-4'- and -5'-sulfonic acid.

The production of these azo components is carried out according to processes known in the literature.

Examples of 1-amino-2-hydroxy- or -2-alkoxy-5-nitrobenzenes which can be applied as diazo components according to the invention, besides unsubstituted 1-amino-2-hydroxy-5-nitrobenzene are among others 1-amino-2-methoxy-5-nitrobenzene, 1-amino-2-ethoxy-5-nitrobenzene, 1-amino-2-hydroxy-3,5-dinitrobenzene, 1-amino-2-hydroxy-3-chloro-5-nitrobenzene, 1-amino-2-hydroxy-5-nitrobenzene-3-sulfonic acid.

The o,o'-dihydroxy azo dyestuffs obtainable by the application of 1-amino-2-hydroxy-5-nitrobenzenes can be transformed according to conventional processes in substance or on a substrate into their metal complex compounds. From the o-hydroxy-o'-alkoxy azo dyestuffs which result from the use of 1-amino-2-alkoxy-5-nitrobenzenes as diazo components the corresponding o,o'-dihydroxy azo dyestuffs may be produced by saponifying the alkoxy group.

In contrast to the hitherto known o-hydroxy-o'-alkoxy azo dyestuffs the saponification of the o'-alkoxy groups of the nitro group containing o-hydroxy-o'-alkoxy azo dyestuffs obtainable according to the present process can be carried out in an especially simple manner by treatment with aqueous alkali metal hydroxide solutions, optionally with warming. The exchange of the alkoxy groups for the hydroxy groups is thereby readily effected and the corresponding o,o'-dihydroxy azo dyestuffs are obtained in excellent yields. This method is especially recommended for the production according to the invention of o,o'-dihydroxy disazo dyestuffs since the coupling of 1-amino-2-hydroxybenzenes with derivatives of 4-hydroxy azobenzene dyestuffs or of 4-hydroxybenzene-azo-naphthalenes leads only to poor results according to experience.

The o-hydroxy-o'-alkoxy azo dyestuffs can also be converted by known processes in one process step into their metal complex compounds, e.g. into the chromium, cobalt and copper complexes, of which the last mentioned can be transformed readily by elimination of the copper into the corresponding o,o'-dihydroxy azo dyestuffs.

The metal-free dyestuffs obtainable according to the invention are well suited to the dyeing of wool or wool-like materials according to the single bath or after-chroming process whereby dyeings of good general fastness properties are obtained.

Valuable dyeings are also achieved with sulfonic acid group free o,o'-dihydroxy azo dyestuffs which are metallized in substance, preferably chromed or cobalted. The chroming or cobalting is carried out in this connection advantageously according to those known processes which lead to 1:2 complexes. Processes of this kind are for example, reactions with chromates in the presence of reducing agents or with salicyclic acid complexes of trivalent chromium or with ammine complexes of trivalent cobalt.

For the metallizing, mixtures can also be used of two different o,o'-dihydroxy azo dyestuffs of the kind obtainable according to the process. The transformation of the dyestuffs into their metal complex compounds can also be carried out in a mixture with other metallizable azo dyestuffs such as o,o'-dihydroxy, o-hydroxy-o'-amino or o-hydroxy-o'-carboxy azo dyestuffs.

The dyestuffs metallized in substance are readily soluble in water. The chromium and cobalt complex compounds dye wool, silk, leather and polyamide materials from neutral to weakly acid baths whereby dyeings with good general fastness properties are obtained.

The following examples are given for the purpose of illustrating the invention without, however, limiting it thereto.

*Example 1*

15.4 g. of 1-amino-2-hydroxy-5-nitrobenzene are dissolved in 150 ml. of 2.5% caustic soda and treated with a solution of 6.9 g. of sodium nitrite in 30 ml. of water. Diazotization is carried out by adding dropwise the mixture to 18 ml. of concentrated hydrochloric acid, the temperature being held at about 5° C. by the addition of ice. The diazo compound is added to a solution of 26.6 g. of 4-hydroxy-diphenyl ether-4'-sulfonic acid, 50 ml. of 30% caustic soda and 80 ml. of water with cooling to 0° C. After coupling is completed the azo dyestuff formed is isolated and dried. It is a dark powder which dyes wool in the single bath chrome process in dark reddish brown shades of very good fastness to light and to milling and washing.

*Example 2*

16.8 g. of 1-amino-2-methoxy-5-nitrobenzene are dissolved in 200 ml. of water and 25 ml. of hydrochloric acid and diazotized by gradual addition of a solution of 6.9 g. of sodium nitrite in 30 ml. of water; by applying ice a temperature of 5–10° C. is maintained. The diazo compound is added at 5–10° C. to a solution of 25.0 g. of 4-hydroxy-diphenyl-4'-sulfonic acid, 20 ml. of 30% caustic soda and 30 g. of soda in 350 ml. of water. The o-hydroxy-o'-methoxy azo dyestuff thus formed is isolated and boiled with 1 litre of 1.5 n caustic soda solution for 3 hours under reflux. The strongly alkaline solution of the o,o'-dihydroxy azo dyestuff formed is rendered weakly alkaline to phenolphthalein with hydrochloric acid, treated with common salt and after cooling to room temperature the separated azo dyestuff is filtered off. After drying, it is a black powder which dissolves in water with a dark brown coloration and dyes wool in the after-chroming process in reddish dark brown shades of very good fastness to light, milling and washing.

In a similar manner 24.9 g. of 4-hydroxy-diphenyl-4'-sulfonamide are coupled with the diazo compound obtainable according to the above method. The saponification to the o,o'-dihydroxy azo dyestuff is carried out by heating with 1.4 litres of 1 n caustic soda solution for five hours. The dyestuff obtained dyes wool in the single bath chrome process in dark brown shades of very good fastness to light and water.

*Example 3*

16.8 g. of 1-amino-2-methoxy-5-nitrobenzene are diazotized in the manner described in Example 2. The diazo compound thus obtained is allowed to run into a solution of 26.5 g. of 4-hydroxy-diphenyl ether-4'-sulfonamide, 12 ml. of a 30% caustic soda solution and 30 g. of soda in 300 ml. of water, the temperature being held by cooling at 5–10° C. The coupling product is isolated and heated to 115° C. for 2 hours with 1.5 litres of 1 n caustic soda solution. The clarified solution is partially neutralized with hydrochloric acid and treated with common salt whereby the dyestuff separates out. It dyes wool by the single bath chrome process in fast reddish dark brown shades.

After filtering, the azo dyestuff obtained is stirred in 400 ml. of water to give a paste, and heated to boiling with 120 ml. of a solution of sodium salicylato-chromate with a content of 2.6% of chromium, and 10 ml. of a 30% caustic soda solution. After the metallizing is completed the chromium complex formed is completely dissolved by adding diluted caustic soda solution, the solution is clarified and the dyestuff separated by adding sodium chloride, filtered off and dried. It dyes wool from a weakly acid bath in reddish dark brown shades of very good fastness to light.

If the above obtained o,o'-dihydroxy azo dyestuff is stirred with 500 ml. of water and heated to boiling with 100 ml. of 15% cobalt sulfate solution, the corresponding cobalt complex dyestuff is obtained which is separated by adding sodium chloride, filtered and dried. It dyes wool from a weakly acid bath in brownish red shades of good fastness.

The 4-hydroxy-diphenyl ether-4'-sulfonamide (melting point 193–194° C.) used in this example was obtained from 4-nitro-diphenyl ether-4'-sulfonamide by reduction to 4-amino-diphenyl ether-4'-sulfonamide (melting point 201–203° C.), diazotization and boiling.

*Example 4*

Into a solution of 26.5 g. of 4-hydroxy-4'-amino-diphenyl-3'-sulfonic acid, 10 ml. of a 30% caustic soda solution and 30 g. of soda in 350 ml. of water, a diazo solution of 16.8 g. of 1-amino-2-methoxy-5-nitrobenzene, the production of which was described in Example 2, are allowed to run in with stirring and ice cooling. After completion of the coupling, the dyestuff formed is isolated, dissolved in 1.5 litres of 1 n caustic soda solution and heated for two hours. The clarified strongly alkaline dyestuff solution is neutralized with hydrochloric acid until it is weakly alkaline and the dyestuff is isolated by filtering. It produces when afterchromed on wool, fast black brown dyeings.

If 1-amino-2-hydroxy-3,5-dinitrobenzene is used as a diazo compound, a similar dyestuff is obtained which dyes wool after-chromed in deep olive shades.

The dyestuff paste obtained is dissolved in 800 ml. of water and 18 g. of acetic anhydride are allowed to drop in gradually with stirring at 30–40° C. As soon as free amino groups are no longer detectable, the dyestuff formed is separated by addition of common salt, filtered off and dried.

It dyes wool in the afterchroming process in dark brown shades of good fastness.

If instead of acetic anhydride, 15 g. of chloroacetylchloride are used for acylation, a dyestuff is obtained which dyes wool in similar brown shades of good fastness.

*Example 5*

19.9 g. of 1-amino-2-hydroxy-3,5-dinitrobenzene are dissolved in 150 ml. of warm water and 10 ml. of 25% ammonia. After addition of a solution of 6.9 g. of sodium nitrite in 30 ml. of water, the mixture is allowed to cool and by and by run into a mixture of 30 ml. of concentrated hydrochloric acid and 50 g. of ice. After the diazotization is completed, the diazo compound is added to a solution of 30 g. of 4-hydroxy-azobenzene-4'-sulfonic acid, 20 ml. of a 30% caustic soda solution and 50 g. of soda in 350 ml. of water. After completion of the coupling the dyestuff formed is isolated and dried. It dyes wool according to the single bath and after-chroming processes in fast olive-dark brown shades.

If, instead of the 4-hydroxy-azobenzene-4'-sulfonic acid, the same quantity of 4-hydroxy-azobenzene-3'- or 2'-sulfonic acid is used, dyestuffs are obtained in analogous manner which dye wool in the afterchroming process in yellow to olive dark brown shades with good fastness.

*Example 6*

16.8 g. of 1-amino-2-methoxy-5-nitrobenzene are diazotized according to the instructions of Example 2. The diazo solution obtained is added to a solution of 32 g. of 4-hydroxy-3-methyl-azo-(1,1')-benzene-4'-sulfonic acid, 10 ml. of 30% caustic soda solution and 30 g. of soda in 400 ml. of water with stirring at 5° C. After a short time the coupling is completed; the disazo dyestuff formed is isolated and heated to the boil with 1,2 litres of 1 n caustic soda solution for 2 hours. The strongly alkaline solution of the resulting dihydroxy disazo dyestuff is partially neutralized with hydrochloric acid. After the addition of common salt, the separated dyestuff is filtered off and dried. It dyes wool when afterchromed in intense black brown shades fast to light, washing and milling.

If the isomeric 4-hydroxy-3-methyl-azo-(1,1')-benzene-3'- or 2'-sulfonic acid is used as azo component and the process is otherwise carried out according to the instruction of this example, reddish fast black brown shades are obtained on wool when afterchromed.

*Example 7*

16.8 g. of 1-amino-2-methoxy-5-nitrobenzene are diazotized according to the instructions of Example 2; the diazo compound is allowed to run with stirring at 5–10° C. into a solution of 38.0 g. of 4-hydroxy-3-phenyl-azo-(1,1')-benzene-4'-sulfonic acid, 10 ml. of 30% caustic soda solution and 30 g. of soda in 400 ml. of water. The disazo dyestuff formed is isolated and boiled under reflux with 1.2 litres of 1 n caustic soda solution for 2 hours. The clarified strongly alkaline solution of the dihydroxy disazo dyestuff is partially neutralized with hydrochloric acid, the precipitated dyestuff filtered off after cooling and dried. It dyes wool when afterchromed in deep dark brown shades of good fastness.

If instead of 4-hydroxy-3-phenyl-azo-(1,1')-benzene-4'-sulfonic acid the isomeric 2'- or 3'-sulfonic acid is used as azo component, dyestuffs are obtained in analogous manner with similar fastness properties. The 4-hydroxy-3-phenyl-azo-(1,1')-benzene sulfonic acids used in this example are obtainable by coupling diazotized 1-aminobenzene-2-, -3- or -4-sulfonic acid with 2-hydroxy-diphenyl in known manner.

*Example 8*

16.8 g. of 1-amino-2-methoxy-5-nitrobenzene are diazotized as described in Example 2. With stirring, the diazo compound is allowed to run into a solution at 5–10° C. of 32 g. of 4-hydroxy-3-methyl-azo-(1,1')-benzene-3'-sulfonamide and 30 ml. of 30% caustic soda in 300 ml. of water. The resulting disazo dyestuff is isolated and heated with 1 litre of 1.5 n caustic soda solution for 3 hours to 100° C. The dihydroxy disazo dyestuff precipitated after neutralization of the alkaline solution with hydrochloric acid is, after filtration, stirred in the form of a paste into 400 ml. of water and heated to the boil under reflux with 120 ml. of a solution of sodium salicylato chromate with a chromium content of 2.6%, and 10 ml. of 30% caustic soda solution. After completion of the metallizing, the chromium complex formed is completely dissolved by adding caustic soda, the solution is clarified and the dyestuff precipitated by adding sodium chloride, filtered off and dried. It dyes wool from a weakly acid bath in dark brown shades fast to light, washing and milling.

Similar dyestuffs are obtained, if the isomeric 4-hydroxy-3-methyl-azo-(1,1')-benzene-2'- or -4'-sulfonic acid amides or 4-hydroxy-azo-(1,1')-benzene 2',3'- or -4'-sulfonamide are used.

The corresponding cobalt complexes likewise yield on wool fast dyeings of somewhat more reddish shades.

*Example 9*

16.8 g. of 1-amino-2-methoxy-5-nitrobenzene are diazotized according to Example 2. The diazo compound obtained is allowed to drop with stirring at 5–10° C. into a solution of 36.0 g. of 4-hydroxybenzene-(1,1')-azo-naphthalene-4'-sulfonic acid, 10 ml. of 30% caustic soda and 30 g. of soda in 500 ml. of water. The resulting disazo dyestuff is isolated and warmed with 1.2 litres of 1 n caustic soda solution for 3 hours to 100° C. The strongly alkaline solution of the dihydroxy disazo dyestuff obtained is neutralized with hydrochloric acid, treated with sodium chloride and the separated dyestuff filtered off. It dyes wool when afterchromed in reddish dark brown shades of good fastness.

*Example 10*

The diazo salt solution obtained according to the instructions of Example 2 from 16.8 g. of 1-amino-2-methoxy-5-nitrobenzene is added dropwise with cooling and stirring to a solution of 34 g. of 4-hydroxy-3-chloro-azo-(1,1')-benzene-3'-sulfonamide, 10 ml. of 30% caustic soda solution and 30 g. of soda in 400 ml. of water. The disazo dyestuff formed is isolated and completely saponified by boiling with 1 litre of 1.5 n caustic soda solution to give the o,o'-dihydroxy disazo dyestuff. The precipitated and suction-filtered dyestuff is dissolved moist in 1.2 litres of water and 25 ml. of 30% caustic soda solution and treated dropwise at 85° C. with stirring with a solution of 9 g. of potassium bichromate and 10 g. of glucose in 100 ml. of water. The resulting chromium complex compound of the o,o'-dihydroxy disazo dyestuff is salted out, filtered off by suction and dried. It is a black powder which dyes wool from a neutral or weakly acid bath in reddish brown shades of good fastness.

The dyestuff paste of the dihydroxy disazo dyestuff is dissolved in 1.6 litres of water and 20 ml. of 30% caustic soda solution. At 85–90 C. a cobalt complex solution is added dropwise with stirring having been prepared as follows:

15 g. of crystallized cobalt sulfate are dissolved in 200 ml. of water, treated with 20 g. of ammonium carbonate and the separated precipitate dissolved by the addition of 16 ml. of concentrated ammonia.

After completion of the cobalting, the complex dyestuff is precipitated by adding sodium chloride, filtered off by suction and dried. A black powder is obtained which dyes wool from a neutral or weakly acid bath in fast brownish red shades.

We claim:

1. An azo dyestuff selected from the group consisting of a compound corresponding to the formula

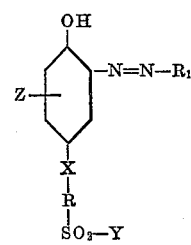

wherein X stands for a member selected from the group consisting of a carbon-to-carbon bond, an oxygen atom, a sulfur atom and an azo bridge, R stands for an arylene radical selected from the group consisting of the benzene and naphthalene series, when X is azo and R stands for a member of the benzene series when X is selected from the group consisting of a carbon-to-carbon bond, an oxygen atom and a sulfur atom, $R_1$ means a diazo compound selected from the group consisting of a 1-amino-2-hydroxy-5-nitrobenzene, 1-amino-2-lower alkoxy-5-nitrobenzene, 1-amino-2-hydroxy-3,5-dinitrobenzene, 1-amino-2-hydroxy-3-chloro-5-nitrobenzene, 1-amino-2-hydroxy-5-nitrobenzene sulfonic acid, Y represents a substituent selected from the group consisting of hydroxyl and amino, and Z stands for a radical selected from the group consisting of hydrogen, lower alkyl, phenyl and chloro; a chromium complex thereof, a cobalt complex thereof and a copper complex thereof.

2. A dyestuff of claim 1 wherein X is a carbon-to-carbon bond.

3. An azo dyestuff corresponding to the formula

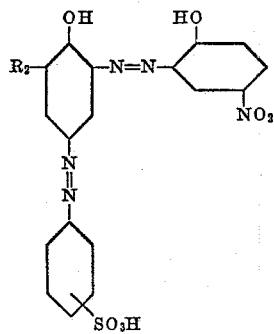

wherein $R_2$ means a radical selected from the group consisting of hydrogen and methyl.

4. Dyestuffs selected from the group consisting of the chromium and the cobalt complex compound of an azo dyestuff corresponding to the formula

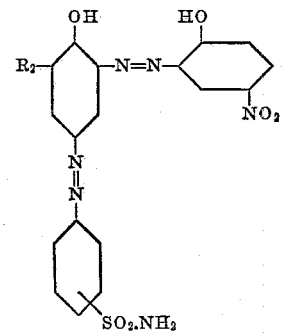

wherein $R_2$ means a radical selected from the group consisting of hydrogen and methyl.

5. The dyestuff corresponding to the formula

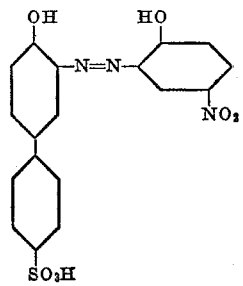

6. The dyestuff corresponding to the formula

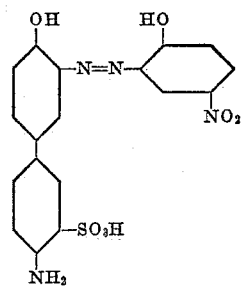

7. The dyestuff corresponding to the formula

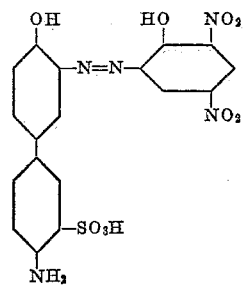

References Cited in the file of this patent

UNITED STATES PATENTS

| | | |
|---|---|---|
| 2,136,650 | Crossley et al. | Nov. 15, 1938 |
| 2,200,445 | Fellmer | May 14, 1940 |

FOREIGN PATENTS

| | | |
|---|---|---|
| 200,250 | Switzerland | Dec. 16, 1938 |